United States Patent Office 3,744,977
Patented July 10, 1973

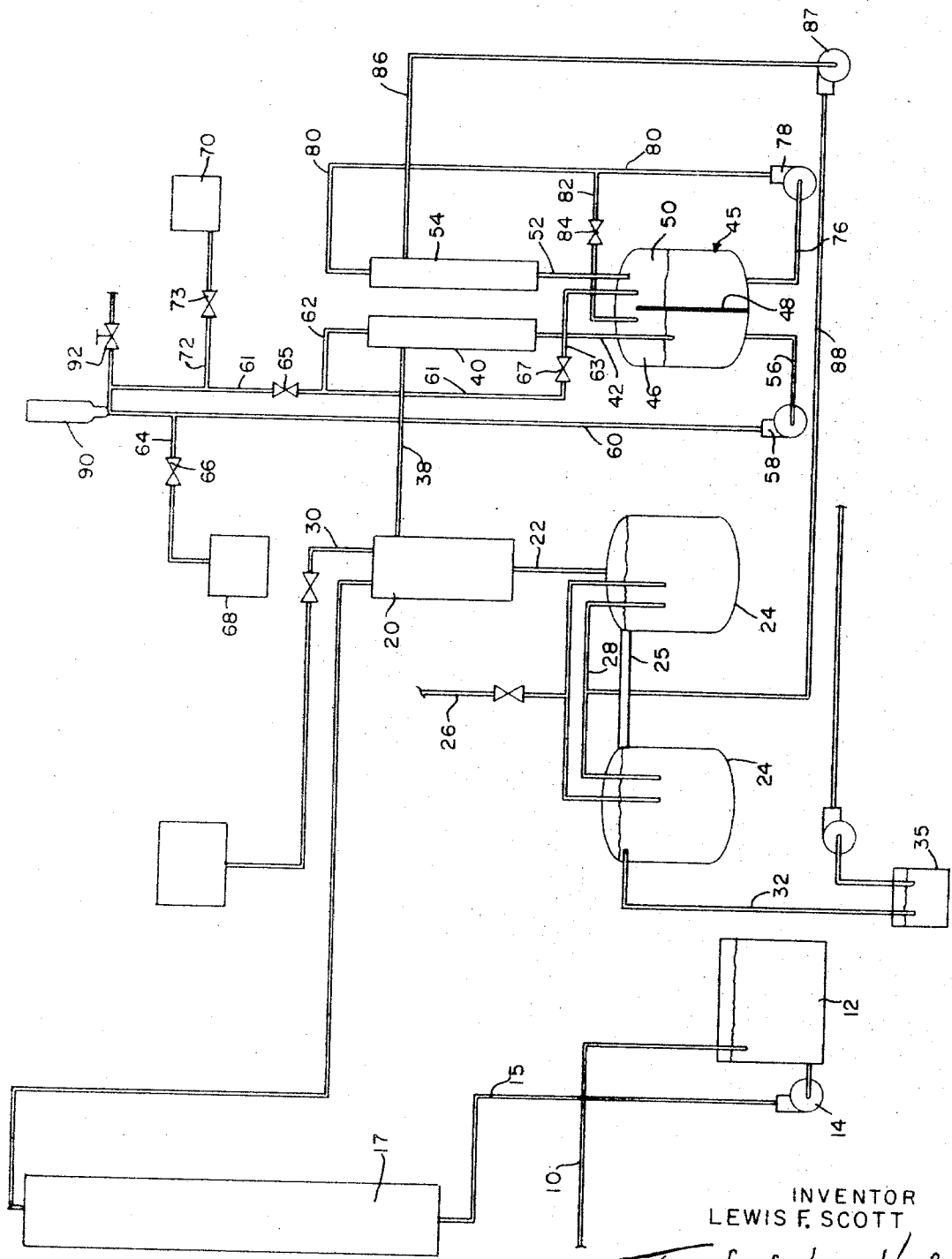

3,744,977
APPARATUS FOR TREATING CYANIDE WASTES
Lewis F. Scott, Indianapolis, Ind., assignor of a fractional part interest to Franke Plating Works, Inc., Fort Wayne, Ind.
Original application Feb. 17, 1969, Ser. No. 799,609, now Patent No. 3,592,586, dated July 13, 1971. Divided and this application Mar. 5, 1971, Ser. No. 121,310
Int. Cl. B01j 1/00; C01c 3/10
U.S. Cl. 23—260                    5 Claims

ABSTRACT OF THE DISCLOSURE

An apparatus for converting cyanide wastes into sodium cyanide in which a heat exchanger is interconnected between a plurality of reaction tanks and a first tower adapted to hold a charge of sodium hydroxide. Said tower is interconnected to one compartment of a chambered tank, and a second compartment in said tank is connected to a second tower adapted to hold a charge of sodium hydroxide. A pumping assembly is provided for withdrawing the sodium cyanide from the first compartment and for recycling the reaction mixture through the towers and the compartmented tank.

BACKGROUND OF THE INVENTION

Sodium cyanide is used in the electro-plating industry as one of the components in the plating bath. During the plating operation, this material is converted into various cyanide waste products which are extremely toxic. Therefore, the disposal of these toxic waste products creates a problem. It is an object of this invention to convert such cyanide waste products back into sodium cyanide which can be used in the plating operation and thus eliminate this toxic waste disposal problem.

This application is a division of my co-pending application, Ser. No. 799,609 filed Feb. 17, 1969, now U.S. Patent No. 3,592,586, issued July 13, 1971.

SUMMARY OF THE INVENTION

In accordance with the preferred form of the invention, cyanide wastes are pumped through a heat exchanger into a vacuumized reaction tank containing an acid solution and into which steam and air are injected. The wastes are reacted with the acid to yield hydrogen cyanide gas which is removed from the reaction tank back through the heat exchanger. The gas is then pumped through a first tower of sodium hydroxide into a chambered tank having a first chamber containing a solution of sodium hydroxide and sodium cyanide. The incoming hydrogen cyanide vapors react with the sodium hydroxide in the tower and the sodium hydroxide in the tank to produce the desired sodium cyanide. The unreacted hydrogen cyanide vapors bubbling out of the solution in the first chamber move through a second tower of sodium hydroxide which is in communication with a second chamber in said chambered tank and which also contains a sodium hydroxide solution to convert the remaining hydrogen cyanide into sodium cyanide which flows back into said second chamber. The non-condensable gases moving through the second tower are returned to the reaction tank to provide gaseous agitation for the reactants therein.

When it is determined, as by analysis, that the reaction is completed in said first chamber of the chambered tank, that is, the hydrogen cyanide therein has been completely reacted with the sodium hydroxide to convert it into sodium cyanide, said chamber is emptied and the solution from the second chamber is pumped into said first chamber and said second chamber is refilled with a fresh solution of sodium hydroxide.

DESCRIPTION OF THE DRAWING

The accompanying drawing illustrates the invention. In such drawing the single figure represents a flow diagram showing the apparatus embodying the invention.

DETAILED DESCRIPTION

As shown, the cyanide wastes to be treated are emptied into a holding tank 12. Said wastes are pumped as by a pump 14, from the tank 12 through a pipe 15 containing a flow meter control 17 into a steam heated heat exchanger 20 where said wastes are preheated to a temperature of about 185° F. The wastes, while still in liquid form, are discharged from the heat exchanger through a pipe 22 into a plurality of reaction tanks 24.

The tanks 24 are connected in series by a conduit 25 having a diameter and a position of connection with respect to said tanks such that there is a free flow of both gas and liquid between the tanks through said conduit. A steam line 26 is also connected to the tanks 24 for maintaining them at the desired temperature. As will become apparent hereinafter, pipes 28 are also connected to the tanks 24 for supplying gaseous agitation thereto.

The tanks 24 contain sulfuric acid which is supplied thereto through a pipe 30 connected between a source of said acid and the heat exchanger 20. The cyanide wastes and sulfuric acid produce a reaction mixture in the tanks 24 having a pH of from about 2 to about 4. The reaction is accelerated by the tanks being maintained at a temperature of about 210° F., said tanks being heated by the steam introduced into said tanks through the line 26. The reaction of the acid converting the wastes into hydrogen cyanide is completed in about 2 hours, and with the elevated temperatures in said tanks, hydrogen cyanide gas is evolved which flows through the conduit 25 and then through the pipe 22 to the heat exchanger 20. The liquid overflow in the tanks 24 is removed through pipe 32 connected to a sump 35.

The hydrogen cyanide gas, together with water vapor, exits the tanks 24 through the conduit 22 and heat exchanger 20 into a pipe 38 connected to a reaction tower 40 containing sodium hydroxide. The tower 40 is connected by a pipe 42 into a chambered tank 45. Said tank has a first compartment 46 containing a solution of sodium hydroxide, the incoming hydrogen cyanide, and sodium cyanide produced by the sodium hydroxide-cyanide reaction. The unreacted hydrogen cyanide gas in the compartment 46 escapes over a baffle 48 in tank 45 into a second compartment 50 and exits said compartment through a pipe 52 connected to a second tower 54 of sodium hydroxide.

The compartment 46 has an outlet 56 connected to a pump 58. The outlet 60 of the pump 58 is connected to a return line 61 provided with a first connection 62 to the top of tower 40 and a second connection 63 to the compartment 50. In order to control the flow through the line 61, a valve 65 is connected in the line upstream of the connection 62 and a valve 67 is connected in the connection 63. A discharge line 64 provided with a valve 66 is connected between the outlet 56 and a sodium cyanide collecting tank 68 for withdrawing the sodium cyanide from the tank 45 as will be more fully described hereinafter.

In order to introduce the sodium hydroxide into the system a tank 70 containing a saturated solution of sodium hydroxide is connected to the return line 61 by a pipe 72 having a valve 73. Thus, when the system is in operation, the valves 66, 73, and 67 are closed and the valve 65 is opened to permit the pump 58 to recirculate the reaction mixture in the compartment 46 as a spray through the tower 40 in the same flow direction as the cyanide vapors entering said tower and compartment.

The compartment 50 also has an outlet 76 connected to a pump 78 having its outlet 80 connected to the top of the tower 54. A by-pass 82 provided with a valve 84 is connected to the outlet 80 and empties into the compartment 46. Thus, with the valve 84 closed, the solution in the compartment 50 consisting primarily of the saturated sodium hydroxide solution is pumped as a spray through the pump 78 into the top of the tower 54. In this manner, the sodium hydroxide flows through the tower 54 in a counter-current flow to any unreacted cyanide vapors moving up through said tower. The sodium cyanide produced in the tower 54 drops back down through the tower into the compartment 50.

Any noncondensable gases in the tower 54 exit to said tower through a pipe 86 connected to a vacuum pump 87 and are returned to the reaction tanks 24 through a pipe 88 connected to the pipe 28 to thus agitate the reaction mixture in said tanks. As will be apparent, the vacuum pump 87 is connected to the reaction tanks 24 through the heat exchanger 20, pipe 38, tank 45, and pipe 86 to thus place the tanks 24 and 45 under a reduced pressure of about 5 inches of mercury and pull the cyanide gas from the tanks 24 through the towers 40 and 54 and tank 45.

An air cushion 90 and petcock 92 are interposed between the outlet 60 and return line 61. Samples of the recirculating reaction mixture in the tower 40 and compartment 46 can be withdrawn through the petcock 92. When it has been determined, as by laboratory analysis of said samples, that the conversion of the hydrogen cyanide into sodium cyanide has been completed, the resulting sodium cyanide is withdrawn from the compartment 46 by closing the valves 65 and 73 and opening the valve 66 to the collecting tank 68.

When the compartment 46 is emptied, the valve 84 is opened to permit the pump 78 to pump the solution in the compartment 50 into the compartment 46. The compartment 50 is refilled with the saturated sodium hydroxide solution by deenergizing the pump 78 and opening the valves 73 and 67 to permit the saturated sodium hydroxide solution from the tank 70 to flow into the compartment 50.

As thus will be apparent, the reaction system consisting of the tower 40 and compartment 46 together with their pump 58 can operate independently of, or in combination with, the reaction system consisting of the tower 54 and compartment 50 together with their pump 78, and each system can be operated independently of, or in combination with, the reaction tanks 24. This permits the sodium cyanide to be withdrawn from the system and the compartments 46 and 50 to be recharged while the acidification reaction is being carried out in the tanks 24.

While the invention has been described as converting cyanide wastes into sodium cyanide, it is to be understood, of course, that the resulting cyanide salt can have any desired cationic substituent depending upon the reactant base employed in the towers 40 and 54, and tank 45.

I claim:

1. An apparatus for converting cyanide wastes into sodium cyanide comprising a plurality of reaction tanks, conduit means interconnecting said reaction tanks, means for heating said tanks, a heat exchanger having a conduit connected to at least one of said reaction tanks, a first tower adapted to hold a charge of sodium hydroxide, a second tower adapted to hold a charge of sodium chloride, a chambered tank having first and second compartments in open communication with each other, second conduit means interconnecting said fifirst tower to said heat exchanger and first compartment, third conduit means interconnecting said second tower to said second compartment, first recirculating means connected to said first tower and first compartment for recirculating a reaction mixture therethrough, second recirculating means operatively connected to said second tower and said first and second compartments for selectively recirculating a reaction mixture through said second tower and first and second compartments, means for removing said reaction mixture from said first compartment, and vacuum means having its inlet operatively interconnected to said second tower.

2. The invention as set forth in claim 1 with the addition that said means for removing the reaction mixture are connected to said first recirculating means.

3. The invention as set forth in claim 1 in which a source of sodium hydroxide is connected to said first recirculating means, said first recirculating means has a branch connected to said second compartment, and valve means are provided in said first recirculating means for selectively recirculating said reaction mixture through said first tower, and first compartment, or permitting sodium hydroxide to flow through said first recirculating means from said source into said second compartment.

4. The invention as set forth in claim 1 in which a source of sodium hydroxide is connected to said first recirculating means, said first recirculating means has a branch connected to said second compartment, and valve means are provided in said first recirculating means for selectively recirculating said reaction mixture through said first tower and first compartment, permitting sodium hydroxide to flow through said first recirculating means from said source into said second compartment, or permitting said first recirculatnig means to be connected to said means for removing the reaction mixture from said first compartment.

5. The invention as set forth in claim 1 in which said vacuum means comprises a vacuum pump having an inlet connected to said second tower and an outlet connected to said reaction tanks.

References Cited
UNITED STATES PATENTS

| | | | |
|---|---|---|---|
| 1,938,469 | 12/1933 | Sulman et al. | 23—79 |
| 1,486,137 | 3/1924 | Halvorsen | 23—79 |
| 2,993,754 | 7/1961 | Jenks et al. | 23—79 |
| 1,178,081 | 4/1916 | Layng | 23—79 X |

JAMES H. TAYMAN, Jr., Primary Examiner

U.S. Cl. X.R.

423—379; 204—45 R, 1 R; 23—285, 283